United States Patent
Van Vlimmeren et al.

(10) Patent No.: US 7,822,070 B2
(45) Date of Patent: Oct. 26, 2010

(54) BUS STATION AND SYSTEM AND METHOD OF MAINTAINING SYNCHRONIZING OF A BUS STATION

(75) Inventors: Bernardus Adrianus Cornelis Van Vlimmeren, Veldhoven (NL); Peter Van Den Hamer, Waalre (NL); Gerrit Willem Den Besten, Eindhoven (NL)

(73) Assignee: ST-Ericsson SA, Geneva (CH)

( * ) Notice: Subject to any disclaimer, the term of this patent is extended or adjusted under 35 U.S.C. 154(b) by 141 days.

(21) Appl. No.: 12/095,158

(22) PCT Filed: Nov. 28, 2006

(86) PCT No.: PCT/IB2006/054467

§ 371 (c)(1),
(2), (4) Date: May 28, 2008

(87) PCT Pub. No.: WO2007/063482

PCT Pub. Date: Jun. 7, 2007

(65) Prior Publication Data

US 2008/0313375 A1   Dec. 18, 2008

(30) Foreign Application Priority Data

Nov. 29, 2005 (EP) ................... 05111413
Aug. 3, 2006 (EP) ................... 06118352

(51) Int. Cl.
*H04J 3/06* (2006.01)

(52) U.S. Cl. .............. 370/503; 370/447; 370/509; 710/117

(58) Field of Classification Search .............. 370/503, 370/509, 250, 466, 447; 710/117
See application file for complete search history.

(56) References Cited

U.S. PATENT DOCUMENTS

| | | | | |
|---|---|---|---|---|
| 6,263,443 B1 * | 7/2001 | Anderson et al. | ............... | 726/1 |
| 6,467,003 B1 * | 10/2002 | Doerenberg et al. | ......... | 710/117 |
| 6,804,205 B1 * | 10/2004 | Nishimura et al. | .......... | 370/296 |
| 7,478,025 B1 * | 1/2009 | Fuller et al. | ................. | 703/13 |
| 2003/0225951 A1 * | 12/2003 | Knapp et al. | .............. | 710/105 |
| 2004/0100992 A1 | 5/2004 | Erlenborn et al. | | |
| 2008/0019401 A1 * | 1/2008 | Addy et al. | ................. | 370/503 |

FOREIGN PATENT DOCUMENTS

EP   0942569 A2   9/1999

\* cited by examiner

*Primary Examiner*—Ricky Ngo
*Assistant Examiner*—Rasheed Gidado

(57) ABSTRACT

A bus station circuit (14) operates in an electronic system with a bus (10). The bus station determines an initial synchronization time point by detecting a synchronization signal pattern on the bus and switching to a synchronization enabled state upon detection of the synchronization signal pattern. Starting points of successive messages are determined head to tail from the end points of immediately preceding messages, when operating in the synchronization enabled state. The content of the messages is tested for validity. The bus station switches to a synchronization disabled state in response to detection of a message with invalid content. While in the synchronization disabled state, use of messages that are received is disabled in the bus station circuit. In the synchronization disabled state the bus station waits for a synchronization event to switch back to the synchronization enabled state.

19 Claims, 3 Drawing Sheets

BUS STATION AND SYSTEM AND METHOD OF MAINTAINING SYNCHRONIZING OF A BUS STATION

FIELD OF THE INVENTION

The invention relates to an electronic system with a bus and bus station circuits coupled via the bus, to a bus station circuit and to a method of operating such a system.

BACKGROUND OF THE INVENTION

A bus is a shared communication medium that can be used by different bus station circuits to transmit messages to each other. The messages are sent from source station circuits to destination station circuits and each message typically carries a destination address to identify the destination station circuit. One problem in such a system is that the start of messages has to be indicated in order to locate the destination address and/or command data in the message.

Various techniques are known for indicating the start of messages. US patent application No. 2003/0225951 describes the use of a special signal line to issue synchronization signals, who's timing indicates the start of messages. Another solution is to transmit a predetermined unique sync pattern on the same line (or lines) as the messages. Typically such a predetermined sync pattern is transmitted at the start of each message, to alert the stations to the start of the message.

However, these synchronization techniques involve overhead that increases the complexity of the system and/or decreases the number of messages that can be sent in a given time interval.

SUMMARY OF THE INVENTION

Among others, it is an object to reduce the overhead used for synchronization in an electronic system with a bus that is used to transmit messages between bus station circuits.

An electronic system according to claim 1 is provided. Herein a bus station circuit uses the content of messages to detect loss of synchronization. Unless there is a gap between messages, the end of one message defines the start of the next, so that in principle no predetermined synchronization pattern, nor a synchronization signal, is needed at the start of each message when a receiving station remains synchronized to the start, and. When the bus station circuit encounters a message with invalid content, the bus station circuit switches to a synchronization disabled state, ignoring messages until a new synchronization has been found. In an embodiment said testing of the content of the messages is performed in the bus station circuit, irrespective of whether the messages are addressed to the bus station circuit. Thus, also the content of messages for other bus station circuits is used to detect loss of synchronization, which increases reliability of detection.

In an embodiment synchronization patterns are provided on the bus, with a plurality of messages between a pair of successive synchronization patterns. In this case, the synchronization patterns may be used to regain a synchronization enabled state wherein head to tail identification of messages can be used. Alternatively, or in addition, idle periods wherein no messages are transmitted on the bus may be used to regain the synchronization enabled state with unnecessarily losing bus-bandwidth.

In an embodiment a plurality of time slots is defined between a pair of successive synchronization patterns. The bus station circuits at least partly define the time slots by measuring the lapse of time after transmission of the first synchronization pattern. After the time interval for a first time slot has elapsed wherein message content based disabling of head to tail identification of messages is used, synchronization is maintained in a different way in a second time slot, before the next synchronization pattern is received. Thus, negative effects of disabling of head to tail identification of messages after detection of invalid message content are limited to only part of the time interval between transmissions of successive synchronization patterns. Streamed data may be received in the entire second time slot, without testing the content of the streamed data to disable reception during part of the time second slot.

In an embodiment a signature value may be computed from the content of a message to test the validity of the message content in order to decide whether to continue using head to tail identification of messages. A signature value could be a parity value for example, or a syndrome, as known from error correcting codes. In another embodiment a validity of a command code from the message is used to decide validity of the content in order to decide whether to continue using head to tail identification of messages. In another embodiment parameter values of a command are used to decide invalidity in order to decide whether to continue using head to tail identification of messages. Preferably command code dependent definitions of ranges of valid parameter values are used to test validity. In a further embodiment ranges of valid command codes and/or parameter values are selected dependent on a destination address of the message to decide validity of the content in order to decide whether to continue using head to tail identification of messages. In an embodiment the validity of a destination address of the message is used to decide validity of the content in order to decide whether to continue using head to tail identification of messages. These techniques for deciding validity may be used on their own or in any combination. Use of command codes, parameter ranges and/or destination addresses has the advantage that no information dedicated to testing of validity needs to be included in the messages.

In a further embodiment testing for the validity of content is also used to search for the start of messages. Thus, synchronization may be regained even without a synchronization pattern.

BRIEF DESCRIPTION OF THE DRAWINGS

These and other objects and advantageous aspects of will become apparent from a description of exemplary embodiments using the following figures.

DESCRIPTION OF EMBODIMENTS

Figure 1:
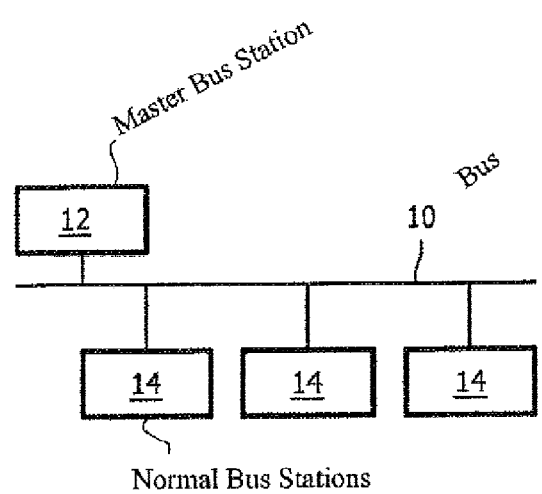
FIG. 1 shows a bus system.

FIG. 1 shows a bus system comprising a bus 10, a bus master station 12 (also called bus host station) and a plurality of normal bus stations 14 (also called slave stations). Normal bus stations 14 and bus master station 12 are coupled to bus 10. Bus 10 may consist for example a data conductor and a clock signal conductor. However, alternatively, only a data conductor may be used, the clock being recovered from signals on the data conductor. Also, a plurality of data conductors may be used in parallel. Preferably, no separate synchronization signal conductor is used in bus 10.

Figure 2:
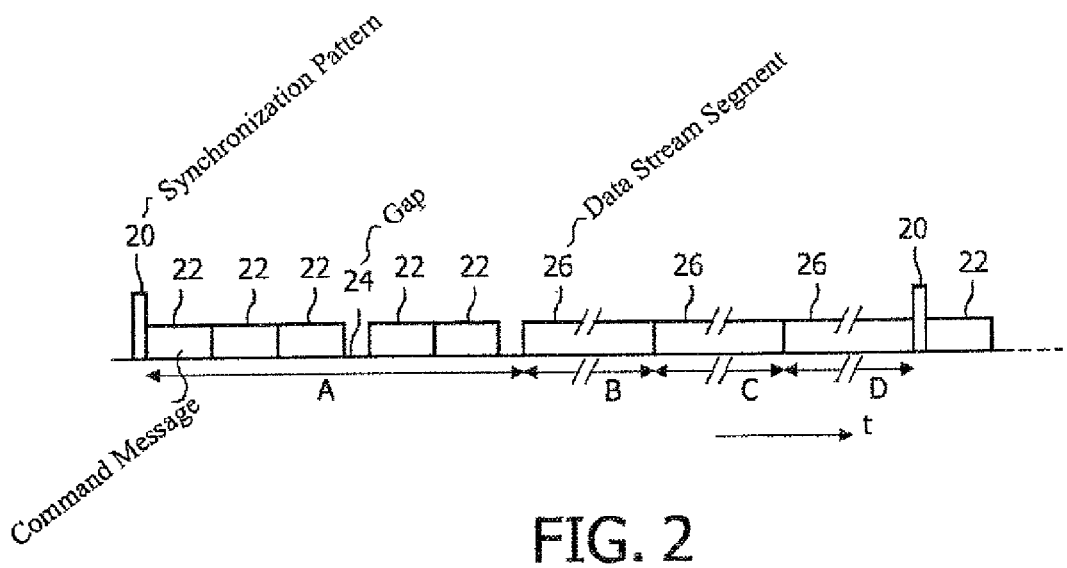
FIG. 2 shows a bus signal.

FIG. 2 schematically shows a bus signal on bus 10 as a function of time "t". The bus signal comprises synchronization patterns 20 and slots A-D between successive pairs of synchronization patterns 20. A number of slots B-D are isochronous slots. Isochronous slots at respective temporal positions relative to each synchronization pattern 20 are allocated for transmission of respective data streams (e.g. audio or video data), typically under minimum throughput constraints. Each isochronous slot B-D contains a segments 26 of the data stream to which is allocated.

A first slot A following transmission the synchronization pattern 20 is a command message slot, wherein bust stations 12, 14 transmit and receive command messages 22. First slot A need not be completely filled. Gaps 24 may occur, wherein bus 10 is idle.

Figure 3:
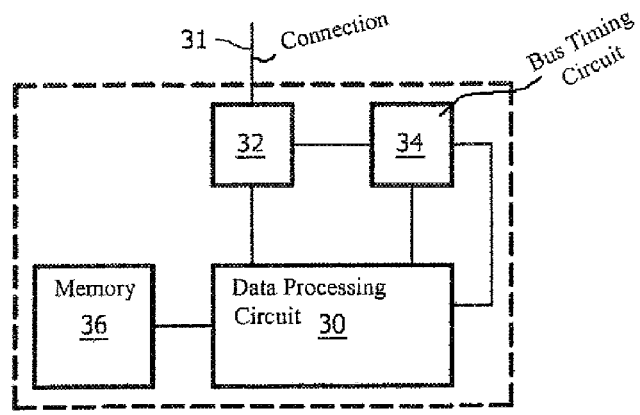
FIG. 3 shows a bus station circuit.

FIG. 3 shows a bus station circuit. The bus station circuit comprises a connection 31 to a bus (not shown) a data processing circuit 30, a bus interface circuit 32, a bus timing circuit 34 and a memory 36. Bus interface circuit 32 is coupled between data processing circuit 30 and bus 10 (not shown). Bus timing circuit 34 is coupled to bus interface circuit 32 and data processing circuit 30. Memory 36 is coupled to data processing circuit 30 (bus master station 12 may have a similar structure, the bus interface acting as transmitter).

In operation bus interface circuit 32, among others, acts as a receiver that receives messages from the bus and supplies the content of the messages to data processing circuit 30. If a message is destined for the bus station circuit data processing circuit 30 uses a command code and parameter information from the message to control its operation. It should be appreciated that considerable freedom exists as to whether functions of the bus station circuit are performed by data processing circuit 30, bus interface circuit 32 and bus timing circuit 34. Therefore these circuits will jointly be called a message processing circuit. The division into data processing circuit 30, bus interface circuit 32 and bus timing circuit 34 is primarily functional: bus interface circuit 32 handles content independent aspects of bus signal handling, such as extraction of bits, separating messages, detection of synchronization patterns etc., data processing circuit 30 handles content dependent functions, such as interpreting and executing commands in the messages and content validation (a programmable processor that is programmed to perform these functions may be used for example, or alternatively a dedicated circuit with transistor connections arranged to perform these functions may be used) and bus timing circuit 34 handles timing aspects, such as signaling the time at which messages start, the start of time slots etc.

Figure 4:
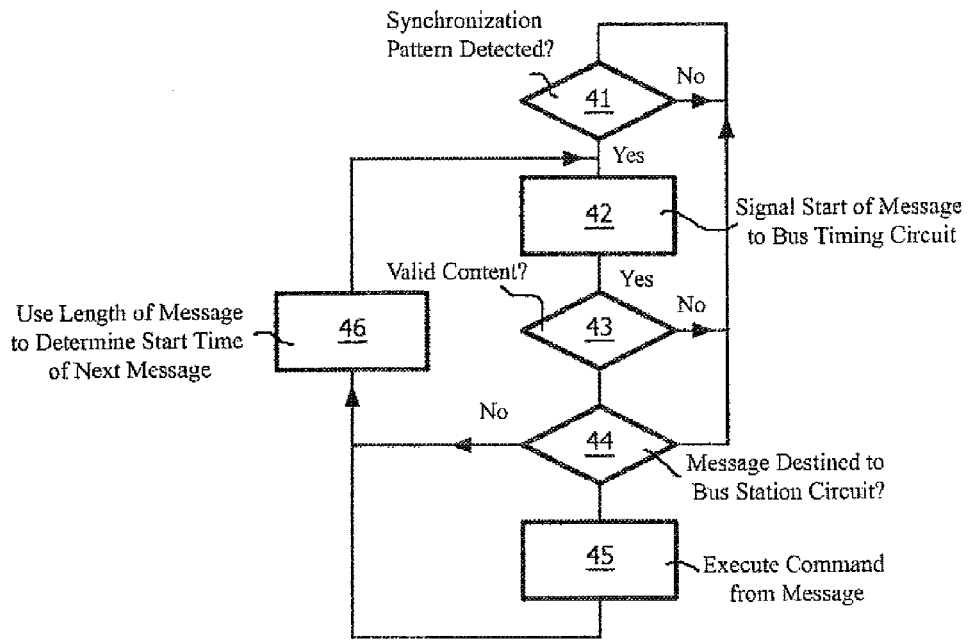
FIG. 4 shows a message processing flow-chart.

FIG. 4 illustrates operation of the bus station circuit. Initially the bus station circuit is in a disabled state, symbolized by a looping step 41. In looping step 41 bus interface circuit 32 (or data processing circuit 30) compares signals received from bus 10 with the predetermined synchronization pattern, to detect transmission of the synchronization pattern 20. Looping step 41 is repeated as long as no synchronization pattern is detected. The bus station circuit is said to be in the disabled state as long as looping step 41 is repeated.

Once the synchronization pattern is detected the bus station switches to an enabled state, which in the flow-chart corresponds to the execution of the remaining steps, other than looping step 41. After switching to the enabled state data processing circuit 30 executes a second step 42, wherein the start of a message is signaled to bus timing circuit 34. Bus timing circuit 34 indicates the start of messages to bus interface circuit 32. Upon receiving an indication of a start of a message bus interface circuit 32 receives the content of a message from bus 10 and supplies the content to data processing circuit 30. In a third step 43 data processing circuit 30 tests the validity of the content. If the content is invalid, data processing circuit 30 causes the bus station circuit to return to the disabled state, i.e. in terms of the flow chart to resume looping step 41, disabling bus timing circuit 34 to signal the start of a message.

It should be appreciated that, although the terms disabled state and enabled state are used, these terms apply only to the ability of the bus station circuit to receive new messages. The fact that the bus station circuit is in the disabled state does not necessarily mean that it is disabled to perform other functions, or for example to transmit or receive in a synchronous time slot B-D, when the timing of those synchronous time slots is determined only by the synchronization pattern 20 and not by messages 22 in first slot A.

Various alternatives may be used to test for validity. In one embodiment data processing circuit 30 reads the command code from the message and compares it with a list of valid command codes. In a further embodiment memory 36 stores lists of valid command codes (or ranges of valid command codes) for different types of bus station circuits and information identifying the type of bust station circuit associated with respective destination addresses. For example, when a bus station circuit is a storage device, it may for example support "load" and "store" commands, but not "display" related commands, but if the bus station circuit contains a display screen, it may support a display related commands but not load and store commands.

In this further embodiment data processing circuit 30 also reads a destination address from the message and uses the address to retrieve the command codes (or ranges) for the type of bus station that is associated with the destination address. Data processing circuit 30 compares the command code from the message with the commands (or ranges) from the list. If the command from the message is not on the list (or in a range from the list), data processing circuit 30 detects that the command is invalid. It should be noted that this type of test for valid commands is not limited to messages that are addressed to the bus station circuit that tests for validity. The validity of messages for any other bus station circuits can be tested in this way.

In another embodiment a similar approach may be used for parameter values in the message. For example, if at least some bus station circuit supports reading and writing to a range of addresses, memory 36 may store information about that address range in association with the destination address of that station and data processing circuit 30 may use this information alone or in addition to other tests to check the validity of the message.

In another embodiment signature information from the message may be used to decide whether to switch to the disabled state. In this embodiment a bus station circuit that transmits a message includes redundant information in the message so that evaluation of a given mathematical signature function with the message as argument will yield a predetermined value. A simple example of additional information is a one-bit parity, selected so that the number of bits in the message that is logic one is even. In this case evaluation of the mathematical function involves determining whether the number of bits in the message with a value of logic one is even or odd. However, other types of parity information, which is known per se from error detecting codes, may also be used. In this embodiment data processing circuit 30 evaluates the message according to a signature evaluation function to determine whether this results in a predetermined value. If not, data processing circuit 30 switched the bus station circuit to the disabled state.

In another embodiment state information about the other bus station circuits may be used to test validity of the message. In this embodiment data processing circuit 30 maintains information about a state of the system as a whole, or in an alternative embodiment, about the state of individual bus station circuits. Each time when data processing circuit 30 receives a command, even when the command is not destined to the bus station circuit of which data processing circuit 30 is part, data processing circuit 30 uses information from the command to update the state information. The state information kept by data processing circuit 30 may indicate for example which data streams are currently active from and/or to which stations, which bus station circuits have been switched on or off, or switched to certain modes of operation. In this embodiment memory 36 stores information about commands and/or parameter values that are valid for bus station circuits associated with different destination addresses in different states. Data processing circuit 30 uses the state that it has stored for the system (or for the bus station circuit associated with the destination address) and optionally also the destination address of a message and to retrieve information about the valid commands and/or ranges of parameter values in this state for comparison with the command and/or parameter values in the message. If the command and/or parameter values are not valid for the state data processing circuit 30 switched the bus station circuit to the disabled state, disabling bus-timing circuit 34 to signal the start of a message. In another embodiment it may be verified that the destination address of the message corresponds to a bus station circuit that is actually present in the system.

Each of these methods of testing validity may be used on its own, or several of these methods may be combined to provide for stronger validity testing. As may be noted, none of the methods require that a predetermined synchronization pattern is present in the bus signal to detect loss of synchronization.

If the content of the message is found to be valid a fourth step 44 is executed, wherein data processing circuit 30 determines whether the message is destined to the bus station circuit of which data processing circuit 30 is part. If not, the process returns to second step 42 via a sixth step 46, i.e. it remains in the enabled state and no search for a new synchronization pattern is performed before receiving the next message. If the message is addressed to the bust station circuit, data processing circuit 30 executes a fifth step 45 executing the command from the message and returns to second step 42 via sixth step 46, i.e. it remains in the enabled state and no search is made for a synchronization pattern. In sixth step 46 bus timing circuit 34 uses the length of the message to determine the start time of the next message for execution of second step 42. Alternatively data processing circuit 30 may signal to bus timing circuit 34 that a start of message may be signaled.

It should be noted that third step 43, using the content of the message to check for validity, is executed in the bus station circuit regardless of whether the message is destined for the bus station circuit in order to switch to the disabled state the bus station circuit until synchronization is regained. It should be appreciated that the order of the steps is not critical, for example several steps could be executed in parallel. In an embodiment, part of the provisions in data processing circuit 30 that are provided for command parsing are also used for testing validity of the message. Thus, no large overhead is needed to control synchronization.

In one embodiment looping step 41 only tests for the presence of synchronization pattern 20. This is done for example by bus interface circuit 32. However, additional tests may be used. In a further embodiment an idle period 24 is used as well. In this embodiment the bus station circuit (e.g. bus interface circuit 32) switches to second step 42 when it detects that during the first slot A and idle interval 24 occurs in which no message is transmitted and subsequently message transmission resumes. Thus, during first slot A idle signals 24 are also used switch from the disabled state to the enabled state.

Different synchronization techniques may be used in different slots A-D. Bus timing circuit 34 may be arranged to count a predetermined time interval from reception of the synchronization pattern 20 until the end of first slot A and thereupon to signal bus interface circuit 32 that a different synchronization technique must be used, compared with the first slot A. Subsidiary synchronization patterns may be included in the bus signal at the start of different slots A-D. In this case bus interface circuit 32 may be arranged to detect these subsidiary synchronization patterns and to switch to different synchronization techniques upon detecting these patterns. Also a combination of time interval counting and subsidiary pattern detection in a time interval around the start of a time slot may be used to detect the start of the time slots to switch to different synchronization techniques.

In a further embodiment a search for valid commands may also be used to leave the disabled state. In this embodiment successive potential starting points of messages are tried and the messages that result from such starting points are checked for validity until a valid message (or a predetermined number (e.g. two to five) successive valid messages) is detected, upon which second step 42 is started.

Although an example has been shown wherein the first time slot A that contains the messages is the first time slot following synchronization pattern 20 it should be appreciated that alternatively another time slot, with a synchronous time slot between this time slot and the next preceding synchronization pattern, may be used for messages instead of first time slot A. Also a plurality of time slots with intervening synchronous time slots and without intervening synchronization patterns may be used instead of only first time slot A.

In an embodiment the dataflow is divided into (among others) frames, which are subdivided into slots and cells. A cell is the smallest unit that appears on the communications system and carries a single bit of information. Four cells are combined into a slot, which is the basis for allocating bandwidth on the system according to the invention. In a preferred embodiment Frames repeat at 768 cells. Because audio applications typically require a fixed bandwidth, a channel mechanism may be used advantageously. Dynamically, slots can be grouped into channels by the bus management unit (host station or master station), so that specific applications can transmit or receive information with a predetermined latency and throughput.

Preferably data and control traffic is unified on a single bus line. To facilitate this, one channel has been predefined: the control channel. A protocol is defined inside this channel that allows multiple device to send asynchronous messages to each other inside this channel.

Figure 5:
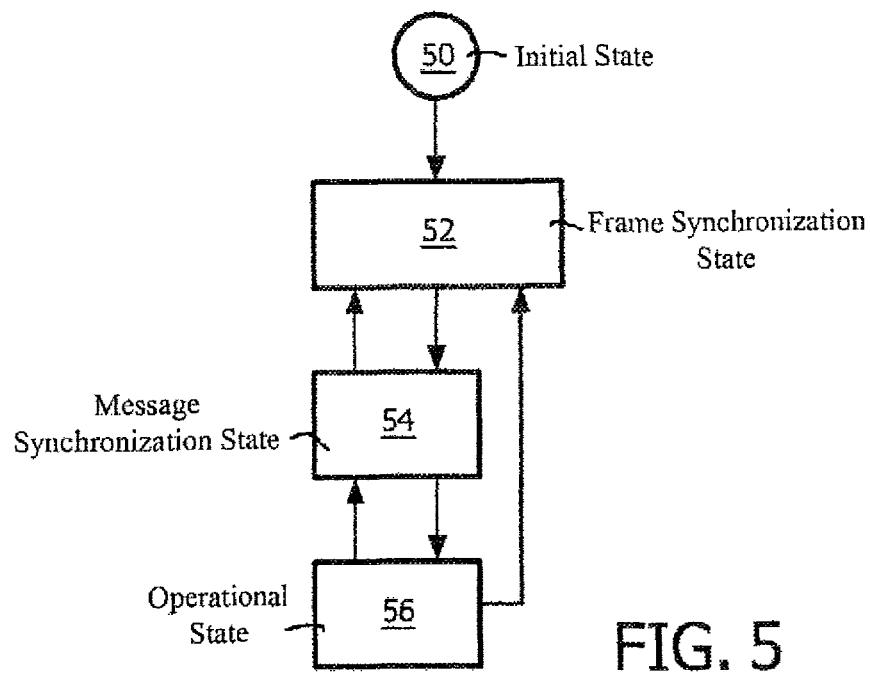
FIGS. 5, 6 show state diagrams.

FIG. 5 shows a state diagram illustrating synchronization. On a TDMA (Time-Domain Multiplexed Access) bus communications system, it is desirable that each of the connected devices knows at what point in the data stream, a new frame (and/or slot) commences. All synchronization mechanisms are preferably multiplexed onto the data line. An additional control protocol is used by which synchronization to the control channel has been achieved. This is particularly advantageous for use with an asynchronous protocol that allows any device or station to start transmission at any time whenever the control channel is available (i.e. not in use). Thus any device that synchronizes to the frame structure is arranged to detect whether the control channel is empty. This is called 'message synchronization'.

In an embodiment synchronization proceeds as shown FIG. 5, where from the initial state 50, a device starts searching for the embedded information that lead to synchronization to the frame structure, switching to Frame Synchronization state 52. In this state the control channel is observed to search for the embedded information and upon finding this switches to a message synchronization state 54. After message synchronization, a switches to an operational state 56 wherein it is capable of sending and receiving data over the bus. All the upward arrows in FIG. 5 indicate reactions to error conditions that may appear on the bus. Failing to parse the messages in the control channel correctly for some time, may lead to a device switching back to the message synchronization state 54, while failure to verify the embedded frame synchronization information may cause a device to return to the frame synchronization state 52. This allows a low-cost, low-overhead mechanism for achieving and verifying the message synchronization.

Figure 6:
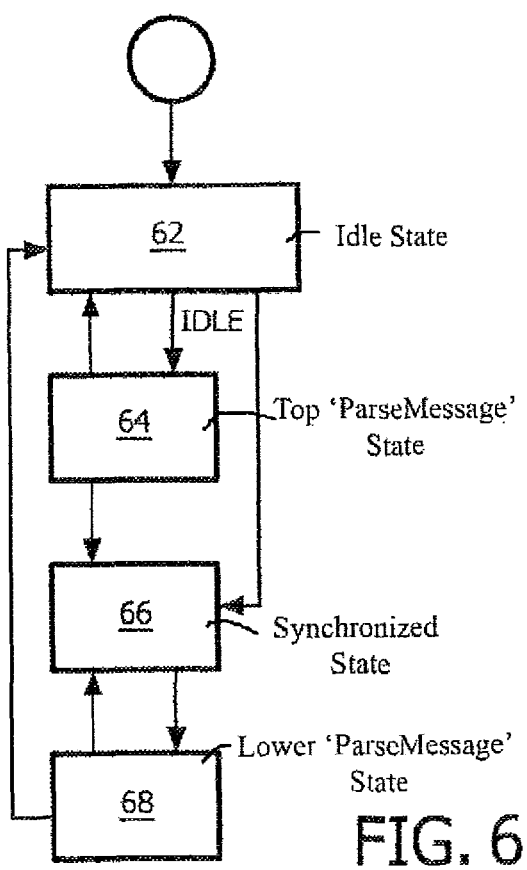

FIG. 6 shows another state diagram, further illustrating synchronization. The message protocol in the method according to the invention typically has a number of features that can be used to achieve and/or verify the message synchronization:

Special symbols might be used to indicate the absence of a message (IDLE).

Special symbols might be used to indicate the start/end of a message.

The message might need to conform to certain rules (i.e. the length in bytes must be indicated in the first byte etc).

The message might contain error correction/detection codes.

An advantage of the method according to the invention is that any or a combination of the features described above can be used to achieve and verify message synchronization.

As an example: an embodiment of the method used in the communications system uses the symbol or code "0x00" in spaces between messages. However, there is a probability that the code "0x00" appears inside a message if no additional coding is applied. Therefore, if no special coding is used detection of a single "0x00" is usually insufficient for use as message synchronization, but is an indication that the control channel might be idle. Successive "0x00" appearing will increase the probability that the message channel is idle. If the number of "0x00"'s exceed the length of a message, message synchronization has been achieved. If other values are detected, the start of a message is assumed and the device starts parsing the incoming data as though it was in message synch. On detection of an error, we restart the whole process. This example is shown in the FIG. 6.

In FIG. 6 the top 'ParseMessage' state 64 is used to achieve synchronization. The transition leading back to the detect IDLE state 62 is triggered whenever a mismatch is detected between the expected message structure and the received structure (such as a CRC failing). If a long enough IDLE period is detected, a direct transition from the Detect IDLE to the Synchronized state 66 is possible. The lower ParseMessage state 68 is used to verify synchronization instead of achieving it.

The embodiments of the present invention described herein are intended to be taken in an illustrative A method of communications is provided for use in a time domain multiplexed communications system comprising a host station and a slave station connected via a communications bus, the communications bus having first line for distributing a clock signal and a second line for transferring data between the host station and the slave station, characterized in that synchronization information is transmitted over the data line. Various modifications may be made. For instance it will be clear that instead of a single data line a plurality of data lines may be used.

The invention claimed is:

1. A bus station circuit comprising:
    a bus interface configured to receive command messages and data from a bus;
    a detector configured to detect transmission of synchronisation patterns on the bus; and
    a message processing circuit configured to process the messages and the data, and to
        switch from a synchronisation disabled state to a synchronisation enabled state in response to detection of a synchronisation pattern,
        define at least a first time-slot and a second time-slot that follows on the first time slot, both time-slots between a pair of successive synchronisation patterns,
        during the first time-slot: identify starting points of successive messages head to tail from the end points of immediately preceding messages when operating in a synchronization enabled state, test content of the messages for validity, and switch to a synchronization disabled state wherein the identification of starting points is disabled subsequent to a message with invalid content, in response to detection of the message with invalid content,
        detect the start of the second time slot in which synchronisation is maintained in a different way before the next synchronisation pattern is received, and
        upon the detected start of the second time-slot, switch to a mode wherein the second one of the bus station circuits receives data from the second time-slot as a whole.

2. The bus station circuit according to claim 1, wherein the messages carry a destination address to identify the destination bus station circuit, and the message processing circuit is configured to perform said testing of the content of the messages and switching, irrespective of whether the messages are addressed to bus station circuit or not.

3. The bus station circuit according to claim 1, wherein the synchronisation pattern is an idle period on the bus.

4. The bus station circuit according to claim 1, wherein the start of the second time slot is detected by measuring elapsed time from detection of a first one of the pair of synchronisation patterns.

5. The bus station circuit according to claim 1, wherein the message processing circuit is configured to transmit and/or receive isochronous data in the second time slot.

6. The bus station circuit according to claim 1, wherein the message processing circuit is configured to perform said testing by verifying a signature value computed from the message.

7. The bus station circuit according to claim 1, wherein the message processing circuit is configured to perform said testing by testing whether a destination address of the message does not correspond to a bus station circuit in the system.

8. The bus station circuit according to claim 1, wherein the message processing circuit is configured to perform said testing by testing whether a command code in the message is a valid command code.

9. The bus station circuit according to claim 8, wherein the message processing circuit is configured to define valid values of the command code dependent on a destination address of the message.

10. The bus station circuit according to claim 1, wherein the message processing circuit is configured to perform said testing by extracting parameter values of a command from the message and detecting invalidity when the parameter values are not inside a valid parameter value range for a command identified by the command code.

11. The bus station circuit according to claim 10, wherein the message processing circuit is configured to define valid ranges for the parameter values dependent on a destination address of the message and/or a command code in the message.

12. The bus station circuit according to claim 1, wherein the message processing circuit is configured to search for synchronization by
selecting different time points;
extracting respective test messages from the bus, starting from the respective time points;
testing the contents of the test messages for validity;
switching to the synchronization enabled state when validity is found for one of the test messages, using the time point of the start of the valid test message for initializing synchronization.

13. An electronic system comprising a bus and a plurality of bus station circuits coupled via the bus, at least a first one of the bus station circuits comprising a transmitter configured to transmit command messages and data via the bus, at least a second one of the bus station circuits comprising a bus interface for receiving messages from the bus, a detector for detecting transmission of synchronisation patterns on the bus and a message processing circuit for processing the messages from the bus, the message processing circuit being operable in a synchronization enabled state and a synchronization disabled state and configured to:
switch from a synchronisation disabled state to a synchronisation enabled state, in response to detection of a synchronisation pattern,
define at least a first time-slot and a second time-slot that follows on the first time slot, both time-slots between a pair of successive synchronisation patterns,
during the first time-slot: identify starting points of successive messages head to tail from the end points of immediately preceding messages when operating in the synchronization enabled state; test content of the messages for validity; and switch to the synchronization disabled state in response to detection of a message with invalid content, the identification of starting points of messages subsequent to the message with invalid content being disabled in the second one of the bus station circuits when in the synchronization disabled state,
detect the start of the second time slot, in which synchronisation is maintained in a different way before the next synchronisation pattern is received, and
upon the detected start of the second time-slot, switch to a mode wherein the second one of the bus station circuits receives data from the second time-slot as a whole.

14. The electronic system according to claim 13, comprising a bus master circuit configured to transmit synchronization patterns periodically.

15. The electronic system according to claim 14, wherein the message processing circuit is configured to transmit and/or receive isochronous data in the second time slot.

16. The electronic system according to claim 15, wherein the message processing circuit is configured to search for synchronization by
selecting different time points;
extracting respective test messages from the bus, starting from the respective time points;
testing the contents of the test messages for validity;
switching to the synchronization enabled state upon finding validity for one of the test messages, using the time point of the start of the valid test message for initializing synchronization.

17. The electronic system according to claim 13, wherein the message processing circuit is configured to switching to the synchronization enabled state only if, prior to finding validity for said one of the test messages, validity has been found for a further one of the test messages, the time point of the start of the valid test message being derived from said further one of the test messages.

18. The electronic system according to claim 13, wherein the message processing circuit is configured to perform said testing by verifying a signature value computed from the message, and/or by testing whether a destination address of the message does not correspond to a bus station circuit in the system and/or by testing whether a command code in the message is a valid command code and/or by extracting parameter values of a command from the message and detecting invalidity when the parameter values are not inside a valid parameter value range for a command identified by the command code.

19. A method of operating a bus station circuit in an electronic system with a bus, the method comprising:
determining an initial synchronization time point by detecting a synchronization signal pattern on the bus and switching to a synchronization enabled state upon detection of the synchronization signal pattern;
define at least a first time-slot and a second time-slot that follows on the first time slot, both between a pair of successive synchronisation patterns;
during the first time-slot: identifying starting points of successive command messages head to tail from the end points of immediately preceding messages when operating in the synchronization enabled state, testing content of the messages for validity, and switching to a synchronization disabled state in response to detection of a message with invalid content, use of messages that are received while in the synchronization disabled state being disabled in the bus station circuit;
in the synchronization disabled state, waiting for a synchronization event to switch back to the synchronization enabled state;
in the synchronization enabled state, detect the start of the second time slot, in which synchronisation is maintained in a different way before the next synchronisation pattern is received; and
upon the detected start of the second time-slot, switch to a mode wherein the second one of the bus station circuits receives data from the second time-slot as a whole.

* * * * *